United States Patent [19]
Wilson

[11] Patent Number: 6,117,577
[45] Date of Patent: Sep. 12, 2000

[54] AMBIENT PRESSURE FUEL CELL SYSTEM

[75] Inventor: Mahlon S. Wilson, Los Alamos, N. Mex.

[73] Assignee: Regents of the University of California, Los Alamos, N. Mex.

[21] Appl. No.: 09/135,965

[22] Filed: Aug. 18, 1998

[51] Int. Cl.[7] .................................................... H01M 8/04
[52] U.S. Cl. ............................. 429/17; 429/34; 429/30; 429/22; 429/13
[58] Field of Search ................................ 429/17, 34, 38, 429/30, 22

[56] References Cited

U.S. PATENT DOCUMENTS

| | | | |
|---|---|---|---|
| 5,441,821 | 8/1995 | Merritt et al. | 429/17 |
| 5,635,039 | 6/1997 | Cisar et al. | 204/252 |

OTHER PUBLICATIONS

Masahiro Watanabe, Yasutaka Satoh, and Chiyoka Shimura, "Management of the Water Content in Polymer Electrolyte Membranes with Porous Fiber Wicks," J. Electrochem. Soc., vol. 140, No. 11, pp. 3190–3193, Nov. 1993.

Primary Examiner—Maria Nuzzolillo
Assistant Examiner—R. Alejandro
Attorney, Agent, or Firm—Ray G. Wilson

[57] ABSTRACT

An ambient pressure fuel cell system is provided with a fuel cell stack formed from a plurality of fuel cells having membrane/electrode assemblies (MEAs) that are hydrated with liquid water and bipolar plates with anode and cathode sides for distributing hydrogen fuel gas and water to a first side of each one of the MEAs and air with reactant oxygen gas to a second side of each one of the MEAs. A pump supplies liquid water to the fuel cells. A recirculating system may be used to return unused hydrogen fuel gas to the stack. A near-ambient pressure blower blows air through the fuel cell stack in excess of reaction stoichiometric amounts to react with the hydrogen fuel gas.

9 Claims, 7 Drawing Sheets

AMBIENT PRESSURE FUEL CELL SYSTEM

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates to hydrogen-oxygen fuel cells, and, more particularly, to polymer electrolyte membrane fuel cells.

BACKGROUND OF THE INVENTION

Polymer electrolyte fuel cells (PEFCs) are attractive for consumer applications because of their relatively low operating temperature and/or non-corrosive electrolyte compared to other types of fuel cells. On the other hand, the oxygen reduction reaction (ORR) in the strongly acidic environment is not particularly facile and the water management in the PEFC is complicated by the competing needs of adequate hydration of the electrolyte membrane and minimal "flooding" of the gas access channels to the membrane surface. The usual strategy for maximizing the ORR rate in terrestrial applications (i.e., air operation) consists of pressurizing the air for the cathode to maximize the oxygen partial pressure and facilitate its transport in the presence of the nitrogen inert component.

Water management typically consists of humidifying the reactant gases and using hydrophobic materials where appropriate to minimize the accumulation of liquid water. The polymer electrolyte membrane is then hydrated by contact with the water vapor in the reactant streams and by the ORR product water. Optimal hydration is difficult to attain over the full operating envelope with this approach because the membrane tends to dry out at low current densities and the cathode structure tends to "flood" at high current densities where removal of product water becomes an issue.

To balance the needs to pressurize and/or humidify the reactant gases for good performance, a number of auxiliary subsystems become vital. In most cases, it is also necessary to provide a means to cool the fuel cell stack. While this can be integrated into the humidification subsystem in some manner, it typically requires that some manner of cooling plates or cells be integrated into the fuel cell stack, resulting in greater weight, size and complexity. Often, the performance of individual cells within the stack depends upon their location relative to a cooling plate.

One of the major difficulties with such complex systems is the parasitic power required to pressurize the air for the fuel cell stack. An expander on the downstream side can be used to recover some of the power expended. But a state-of-the-art system, such as that developed by Ballard to operate at 3 atm (30 psig), still loses about 20% of its gross power to auxiliary systems, with most of the power loss arising from the compressor. In addition, the compressor/expander system is also relatively large, complicated and expensive. The use of compression also limits the amount of excess air that can be introduced into the cathode plenum. While a substantial excess of air can considerably improve performance, the power requirement for compression quickly overwhelms the advantages gained and typical flows utilized for the cathode air are on the order of two times the stoichiometric flow (or about 50% oxygen utilization).

These considerations illustrate some of the difficulties and challenges inherent in polymer electrolyte fuel cell systems. A number of these difficulties can be alleviated with the use of an effective means for introducing liquid water directly to the membrane/electrode assembly (MEA) instead of humidifying it indirectly via the reactant gases. The advantages of direct liquid hydration have been described by Watanabe et al. (140 J. Electrochem. Soc., pp. 3190 (1993)). Watanabe and Cisar et al. (U.S. Pat. No. 5,635,039), both incorporated herein by reference, have developed internal membrane structures for delivering liquid water directly to the ionomeric membrane. U.S. patent application Ser. No. 08/810,229, filed Feb. 24, 1997, by M. S. Wilson now U.S. Pat. No. 5,592,119 issued Sep. 14, 1999, and incorporated herein by reference, describes another approach that uses "mixed" hydrophobic/hydrophilic gas diffusion backings adjacent the MEA to convey liquid water from separate channels in the anode flow-field directly to the MEA. Liquid water is then introduced to flow-field channels through manifolds and distribution channels similar to the hydrogen distribution of many stack designs. With the MEAs in direct liquid contact with a water reservoir, the membranes stay nearly fully hydrated even at elevated temperatures or low current densities without the need for reactant humidification.

The present invention is directed to a system having fully hydrated membranes that overcomes the problems inherent in pressurized fuel cells using humidified reactant gases. Accordingly, it is an object of the present invention to operate the air cathodes of a fuel cell system at near ambient pressure.

Another object of the present invention is to provide a non-humidified or dry air stream to the fuel cell cathode.

One other object of the present invention is to provide a sufficiently high flow-rate of cathode gas to remove water formed at the cathode so there is no significant accumulation of water.

Still another object of the present invention is to cool the fuel cell stack by direct evaporation of water from the cathode side of fuel cell membrane-electrode assembly (MEA) into the reactant gas in the cathode flow field.

Yet another object of the present invention is to minimize parasitic power losses while providing reactant gases to the fuel cell.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of the present invention includes an ambient pressure fuel cell system. A fuel cell stack is formed from a plurality of fuel cells having membrane/electrode assemblies (MEAs) that are hydrated with liquid water and bipolar plates with anode and cathode sides for distributing hydrogen fuel gas and water to the anode side of each one of the MEAs and air with reactant oxygen gas to the cathode side of each one of the MEAs. Liquid water is supplied to the anode side of the bipolar plate for hydrating the MEAs. A near-ambient pressure blower blows air through the fuel cell stack in excess of stoichiometric amounts for reaction with the hydrogen fuel gas.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

Figure 1:
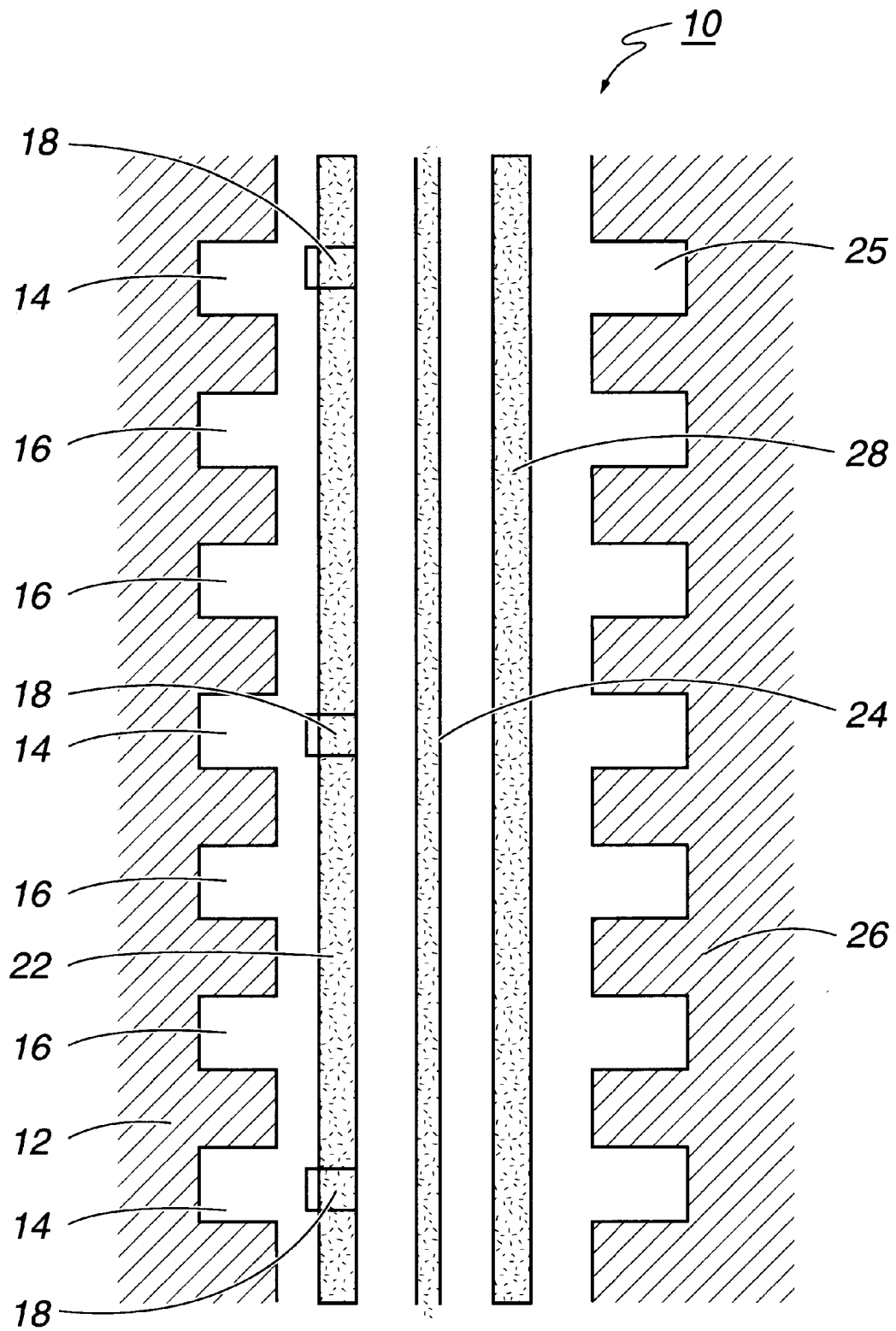
FIG. 1 is a cross-section of a unit cell depicting membrane hydration in accordance with one embodiment of the present invention.

The present invention recognizes that use of direct liquid hydration, such as disclosed by Watanabe et al., Cisar et al., and Wilson, supra, has substantial system advantages. In accordance with the present invention, a fuel cell stack using direct liquid hydration is operated at ambient pressure to produce a simple, low-parasitic power system and to provide direct "evaporative-cooling" from high volume ambient pressure air flow.

Several features are incorporated to enhance performance that might be lost due to the lowering of the oxygen partial pressure. First, since the compression requirements are greatly reduced, substantially more air can be introduced into the cathode plenum without the concomitant parasitic power losses experienced in a pressurized system. The greater the stoichiometric flow of the air, the higher the partial pressure of oxygen (and the ORR rate) throughout the length of the cathode flow-field.

Another factor that serves to lower the oxygen partial pressure in conventional fuel cells is the presence of water vapor. If, for example, the air is first water vapor saturated at a stack temperature of 80 ° C., then about half of the reactant gas flow is actually water vapor, which halves the oxygen partial pressure. Reactant humidification is not needed in this invention because of the direct liquid hydration of the MEA. The gas will pick up water vapor within the cell, but, until the gas heats up to cell temperature and/or becomes vapor saturated, the oxygen partial pressure (and correspondingly, the ORR) will be greater than in the pre-humidified case.

Another performance advantage that is gained if the cathode is operated on non-humidified gases and at a relatively high stoichiometric flow is that little, if any, condensate collects in the cathode flow-field. The absence of liquid water in the flow-field allows the cathode side of the stack to operate with a very small pressure drop (since there is no need to flush out liquid water) and still attain a uniform distribution of reactant throughout. This, in general, greatly simplifies the cathode flow-field design because most of the difficulties in attaining good performance in a conventional stack are associated with removal and management of the condensate water.

A serendipitous benefit of flowing large amounts of unhumidified air through the cathodes is that the air will pick up a substantial amount of water as it heats up. Since a large amount of heat is transferred in this evaporative process, the stack is readily cooled in this evaporative manner. For each milliliter of condensate that is avoided by flowing at a relatively high stoichiometric gas flow, an evaporative cooling effect equivalent to about 4000 Joules (1000 calories) is realized (i.e., the heat of vaporization of water). For comparison, if a coolant such as water were heated 10 ° C. instead, roughly 400 ml of the liquid would be required to supply the equivalent amount of heat removal. Not only would a coolant need to be pumped around through special, space-consuming plates, but a 10 ° C. variation in temperature over the various regions will affect the uniformity of the performance.

Thus, several advantages are realized with the evaporative cooling. First, the stack temperature is somewhat self regulating because the heat removal from the hotter areas is facilitated by the increase in the water vapor concentration with temperature. The stack operates to a certain extent like a heat pipe in that the heat is removed where and as needed. Another major advantage is that, with the "in situ" cooling, conventional cooling plates in the electrochemical stack are not needed. Therefore, the stack can be lighter and smaller for the same power yield and, with fewer internal components, the concomitant ohmic losses and costs are decreased.

It will be appreciated that it would be difficult to supply sufficient water to the MEA for this process to be effective unless the membrane was hydrated by direct contact with liquid water. The use of evaporative cooling generally results in the loss of more water in the effluent stream than that generated by the ORR. A separate water supply may be provided, but the water can be recovered, if necessary, in a separate condenser that can be made lightweight and efficient using low-cost materials. This single external component compares with incorporating cooling plates at periodic intervals in the fuel cell stack that must be electronically conductive, non-corrodable, and the like.

These factors combine to produce an ambient pressure fuel cell system that provides relatively high performance yet is very simple. In the most basic configuration, all that is fundamentally needed is a fuel cell stack (of the appropriate direct hydration design), a water supply (a pump or other means of introducing the hydration water), a hydrogen (fuel) supply, and a blower that forces sufficient air into the cathode plenum to provide adequate cooling of the stack via evaporation. Although blowers are not particularly efficient, it does not take much power to move large amounts of air if the pressure drops are kept quite low. Since the pressure drops of interest here are comfortably less than 10 in. $H_2O$ (0.35 psi), the power requirements are very low compared to compressors operating in the neighborhood of three atmospheres (30 psig).

The preferred design of a "composite" hydrophilic/hydrophobic anode backing has been described for single, pressurized fuel cells in the Wilson '119 patent supra. As described therein and shown in cross-section in FIG. 1, fuel cell 10 provides anode flow-field plates 12 formed with two parallel manifolded channel networks 14, 16, one for fuel (hydrogen) flow 16 and the other for liquid water 14. In this embodiment, every third channel is water filled, as shown in FIG. 1. A hydrophilic wicking thread 18 is selectively sewn into hydrophobic gas diffusion structure (backing) 22 that contacts the catalyzed membrane or membrane/electrode assembly (MEA) 24 in the areas directly spanning the water-filled channels 14. In this manner, liquid water comes in direct contact with MEA 24 and the hydrogen reactant also readily accesses the catalyst layer via the hydrophobic component 22 of the gas diffusion backing. Air channels 25 are formed in cathode flow-field plate 26 to supply air (oxygen) to MEA 24 through cathode backing 28.

Figure 2:
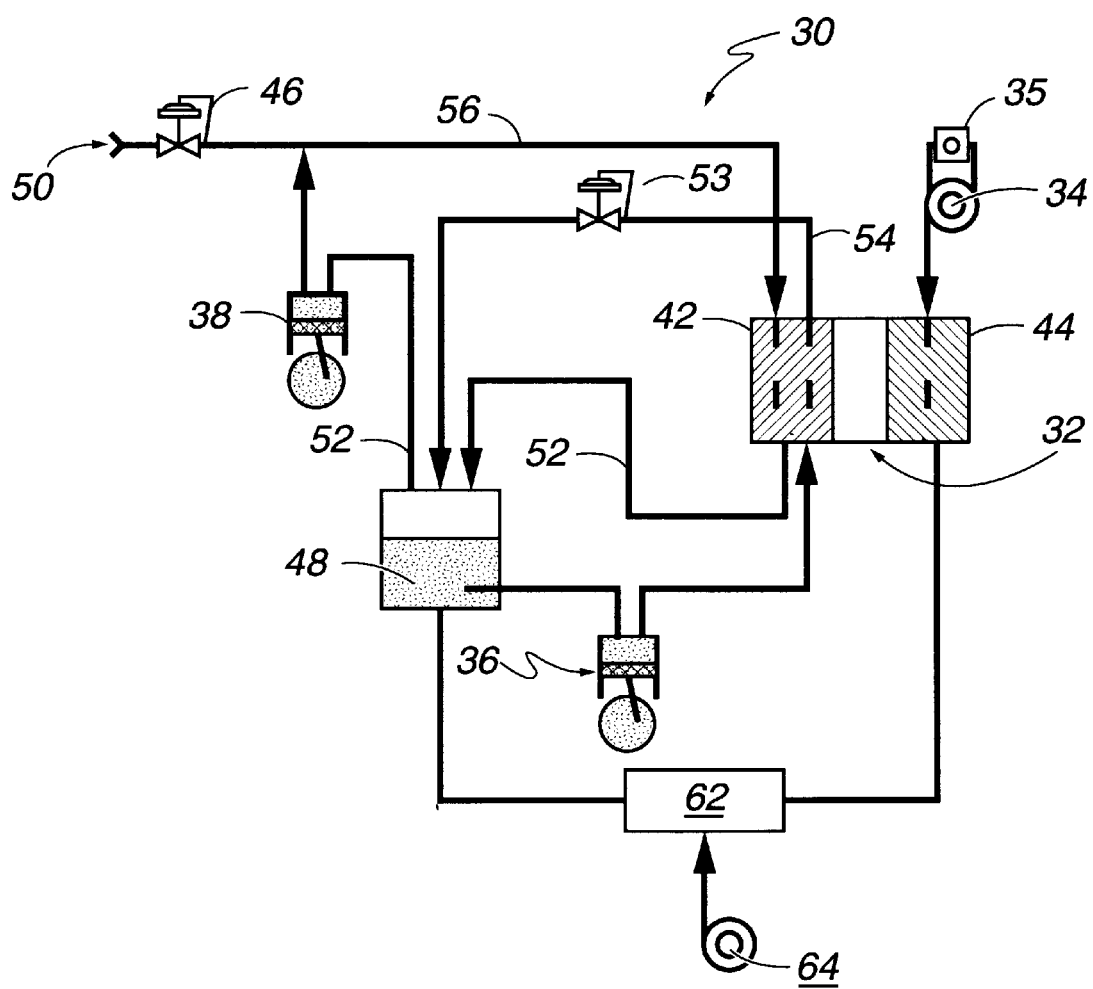
FIG. 2 schematically depicts an ambient pressure fuel cell system according to one embodiment of the present invention.

As shown in FIG. 2, an ambient pressure fuel cell system 30 primarily consists of fuel cell stack 32, air blower 34, water pump 36, and, optionally, compressor 38 for circulating the hydrogen on anode side 42 of cell 44. Compressor 38 is desirable in a system where the hydrogen feed is dead-ended because water tends to condense in the hydrogen channels and needs to be flushed out, otherwise areas of the cells may become starved for reactant. Additional components in the system portrayed in FIG. 2 are relatively simple, such as pressure regulator 53 and a combination water reservoir and water trap 48. In operation, water pump 36 draws from water reservoir 48 and introduces the liquid into the water manifold within the stack that supplies water channels 14 (FIG. 1) in anode flow-field plates 12 of individual cells 10. The water is pumped at a relatively modest rate (e.g., about 15 ml/min in a 400 W system) through stack 32 and back to reservoir 48. While, in principle, the flow rate needs only to be equivalent to the evaporation rate within the stack, a slight circulating flow removes any gas bubbles that may accumulate to assure that a continuous supply of water is provided throughout.

Referring again to FIG. 2, hydrogen fuel 50 is introduced to a hydrogen manifold within stack 32 that supplies the fuel channels in the anode flow-field plates 12 (FIG. 1) of individual cells 10. Pressure regulator 46 maintains the pressure at the front end of stack 32 several tenths of a bar above ambient pressure (several psig). In a static dead-ended system, all of the hydrogen would be consumed in the stack in the electrochemical oxidation process, but additional flow is induced in the system by the use of hydrogen pump 38 in order to flush out condensate from the hydrogen flow channels. Upon leaving the stack, hydrogen recirculation path 52 first passes through water trap 48, which also serves as the water reservoir for the water system, and then to hydrogen pump 38. While pump 38 requires some parasitic power, it is simple to implement.

On larger scale or commercial systems it may be more advantageous to induce circulation by tapping the power available in the compressed hydrogen fuel. One example of such an approach is provided by Ballard (Merritt et al., "Electrochemical fuel cell system with a regulated vacuum ejector for recirculation of the fluid feed stream," U.S. Pat. No. 5,441,821, issued Aug. 15, 1995, incorporated herein by reference). Reactant circulation through the anode plenums is induced by a vacuum drawn on the effluent line by an ejector located on the fuel feed line.

In some applications, it may be desirable to supply the hydrogen for the fuel cell stack by reforming a hydrocarbon fuel. For example, natural gas is a convenient fuel for stationary power applications and a liquid hydrocarbon, such as gasoline, would be convenient for transportation applications. These fuels can be converted to hydrogen using high temperature steam reforming and/or thermal decomposition in a partial oxidation process.

If a partial oxidation (POX) type of reformer is used to generate the hydrogen, the hydrogen content of the fuel stream is only on the order of 40%, with the remainder being $CO_2$ and $N_2$ by-products of the POX. Since it is desirable to use as much of the hydrogen as possible and there are dilution effects on anode performance, the optimal performance is attained with a single-pass flow configuration through the anode, which ideally consumes about 90% or so of the hydrogen. However, some 60% or more of the reactant stream flows on through the anode plenum to provide the desired purge effect to remove the condensate. As such, recirculation in this case is not necessary and would actually be counter-productive. This simplifies the fuel cell system and lowers the parasitic power of the supporting components.

Many fuel processors operate at higher than atmospheric pressure to improve performance and decrease the size of the system. Some advantages are incurred if the anode of the fuel cell can also operate in this pressure range. Although the cathode in the stack design of the present invention operates at near ambient pressure, it is possible to operate the anode at elevated pressures, such as 30 psig, to facilitate the integration of the two systems.

As described in the '119 patent supra, it is desirable to maintain the pressure in water channels 14 (FIG. 1) in the anode plates 12 slightly higher than the pressure in the hydrogen channels 16 in order to avoid the displacement of the water in the channels by the hydrogen. As such, back-pressure regulator 53 is located on the water effluent line 54 to maintain the pressure of the water within stack 32 higher than that of the hydrogen supply line 56.

On the cathode side 44 of stack 32, air is provided simply by a small blower 34 (FIG. 2) to the externally manifolded air channels 25 (FIG. 1) formed in the bipolar plates 26 of individual cells 10. Air blower 34 operates at near-ambient pressure. As used herein, "near-ambient" means a pressure less than about 10 in. $H_2O$ above ambient pressure, and, preferably, less than about 2 in. $H_2O$ above ambient pressure. Since the manifold pressure drop is only on the order of 1 in. $H_2O$ (0.002 bar) at maximum power, the power required is quite small although the flowrates employed are higher than typical for pressurized systems.

As described above, cooling of the stack is obtained by the evaporation of water from the cathode side 44 of the well-hydrated MEA into the cathode airflow stream at each cell. Since the evaporative cooling rate increases with temperature, the temperatures across the stack tend to normalize. In operation, the speed of blower 34 is controlled by controller 35, which may be any conventional speed controller, to maintain the maximum temperature in the stack at a level around 70–75 ° C., except in cases such as start-up, where a relatively high air flow rate is used to prevent the potential accumulation of condensate in the flow channels at the relatively low temperatures at start-up.

The fuel cell system according to the present invention does not require any heat exchangers, radiators, compressor/expanders or humidifier modules. The simplest embodiment of the invention uses a direct water supply for MEA hydration and a near-ambient pressure air blower. A net water loss is incurred with the system described here because the evaporative cooling typically requires more water than that produced by the electrochemical cathode reaction. If the power application is stationary and a water supply is available then a direct water supply provides the least parasitic power losses. If the application is for transportation, then it may be desirable to recover some of the water from cathodes 44, as shown in FIG. 2, in a condenser 62 in order to maintain a sufficient water level. A cooling fan 64 for condenser 62 requires on the order of an additional 1% of the power produced for an air flow rate of about five times the stoichiometric requirement.

Water pump 36 and hydrogen compressor 38 in the system were 12 V DC diaphragm type (Thomas) pumps. Blower 34 was a 12 V DC scroll blower (EG&G Rotron). These components were operated off a 12 V battery. In these examples, rheostats were used for motor speed control.

Figure 3:
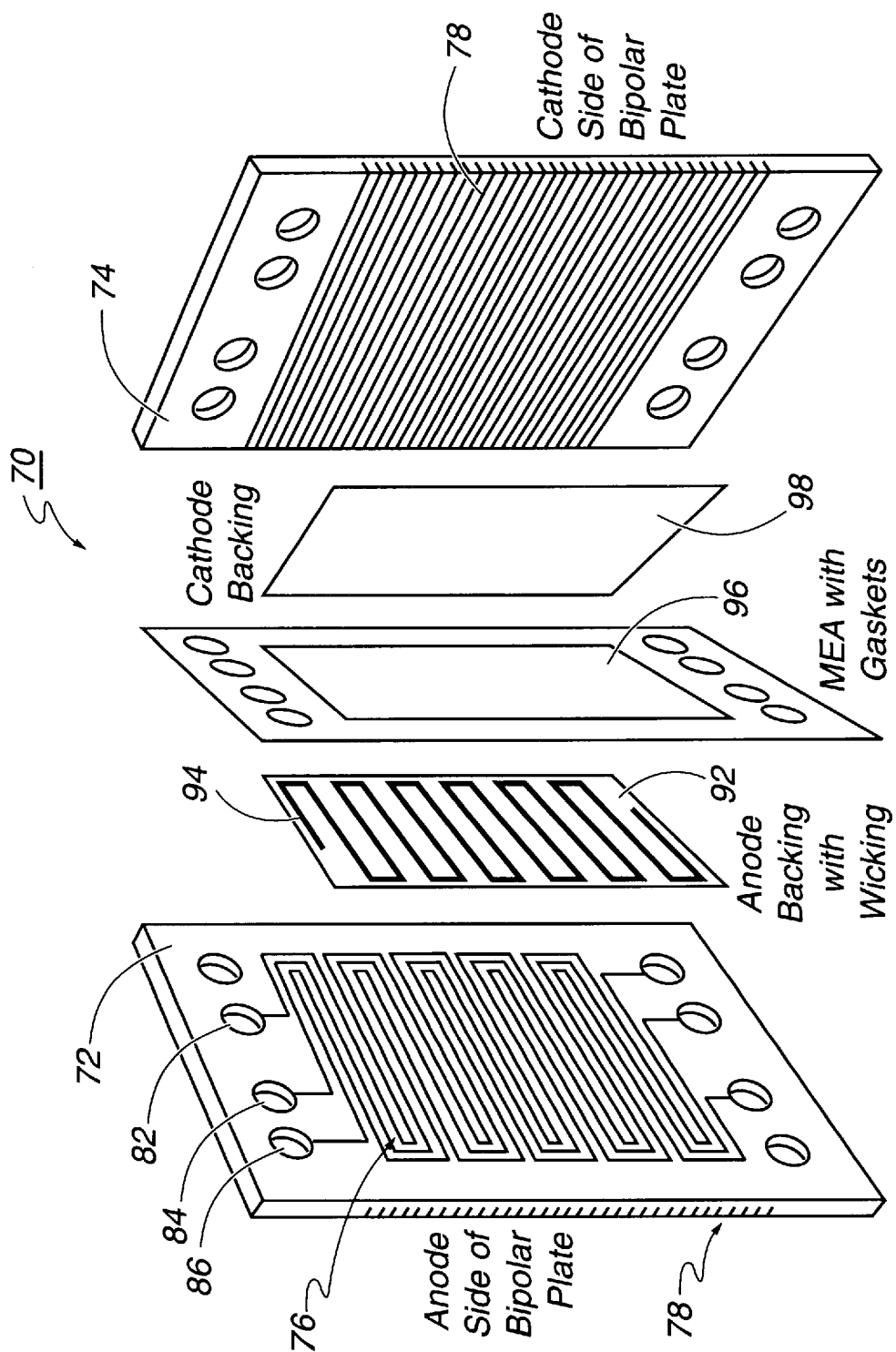
FIG. 3 is an exploded view of a unit fuel cell incorporated within the fuel cell stack shown in FIG. 2.

In an exemplary experimental design shown in FIG. 3, the unit cells 70 in the stacks described here had 100 cm$^2$ (15.5 in$^2$) active areas. Bipolar plates were 3.2 mm (1/8") thick by 12.1 cm×14.0 cm (4.75 in.×5.5 in.) commercial graphite/ epoxy composite plates (Pure Carbon, Inc.), with the anode 72 and cathode 74 flow-fields machined into either side. The channels and ribs forming hydrogen water channels 76 and air channels 78 were both 1 mm (0.040 in.) wide and the channel depths were about 0.8 mm (0.032 in.) on anode side 72 and 1.2 mm (0.050 in.) on cathode side 74. In FIG. 3, the water and hydrogen flow channels 76 machined into the anode side 72 are supplied by separate internal manifolds 84, 82/86, respectively, common to each unit cell 70 in the manner typically employed in conventional internally manifolded stacks. The three-channel serpentine flow-field 76 is arranged and manifolded such that every third channel is water filled. Thus, the first 82 and third 86 manifold penetrations across the top supply the hydrogen fuel gas and the second 84 manifold penetration provides the hydration water. Anode side 72 of the bipolar plate in FIG. 3 abuts anode gas diffusion backing 92, which has wicking thread 94 stitched in an appropriate pattern to overlay the water-filled channel supplied from manifold penetration 84. The wicking thread used in this experimental system was a fine Dacron thread from DuPont that is specifically designed with an internal structure that facilitates the wicking of water, e.g., the thread used in COOLMAX™ fabrics. Any number of suitable threads are available; see, e.g., Watanabe, supra. A computer-controlled embroidery machine is used to sew wicking thread 94 into anode backing 92. The machine is programmed to stitch a pattern in backing material 92 that corresponds to the locations of the water-filled channels.

Catalyzed membrane 96 is arranged conventionally in a "picture frame" of gaskets of the appropriate thickness to seal and allow adequate compression of the active area components. Cathode backing 98 is used as supplied. No wicking is used here as it only would be counterproductive by effectively removing water from the MEA and introducing liquid water to the cathode flow-channels 78. In the embodiments described herein, the gas diffusion backings 92, 98 for both anode side 72 and cathode side 74 were uncatalyzed ELAT from E-TEK, Inc. (Natick, Mass.), and the MEAs 96 were Series 5000 Gore-Primea from W. L. Gore & Assoc. It can be appreciated that materials equivalent in function from other sources can be used for these components.

In contrast to anode 72, cathode air channels 78 are preferably externally manifolded to provide a uniform reactant distribution in a minimal pressure drop configuration. As such, cathode flow-field 78 consists of grooves machined across the width of cathode 74 side of the bipolar plate, as seen in FIG. 3.

The unit cell components depicted in FIG. 3 are then conventionally combined with a number of similar unit cells to provide a fuel cell stack (not shown). Current is collected from either end of the stack of unit cells via gold-plated copper collector plates. These are in turn capped with 1.3 cm (½in.) thick fiber composite plates that electrically and thermally isolate the current collector plates from the aluminum end-plates. The endplates provide compression of the stack components using tie-bolts spaced around the periphery in a conventional manner. The effective cell pitch of only about 3.6 mm (0.140 in.) is enabled by the absence of separate cooling or humidification plates.

Figure 4:
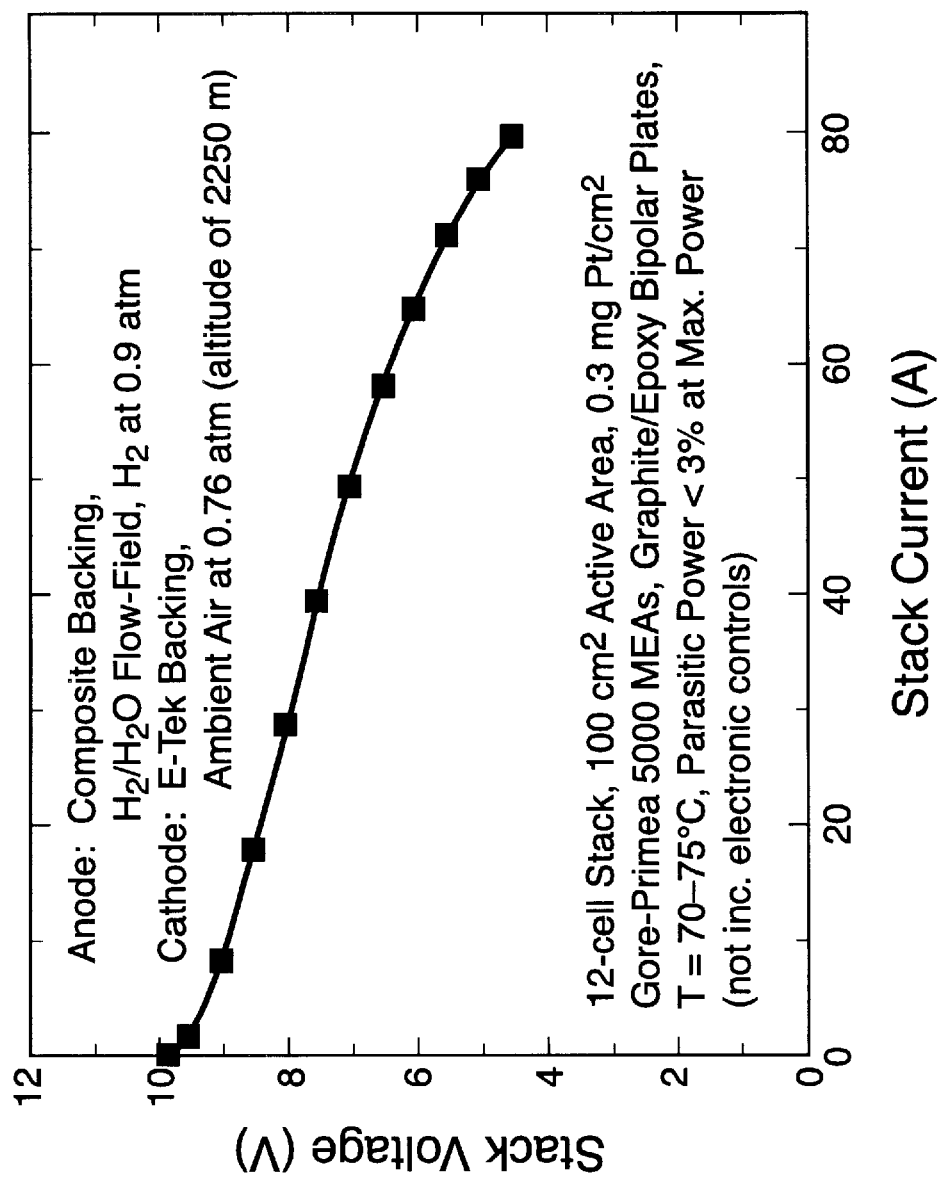
FIG. 4 is a polarization curve for a 12-cell stack using anode wicks with an air manifold pressure of about 1" $H_2O$.

The first embodiment of the ambient pressure system utilized a 12-cell stack. FIG. 4 depicts a polarization curve of this 12-cell stack and system. While this initial stack did not collectively provide a very good open circuit voltage (OCV), the stack provided better performance at higher current densities, e.g., 600 mA/cm$^2$ at 0.5 V/cell, and a maximum power of almost 400 W was attained. It should be pointed out that this performance was obtained at an ambient pressure of only 0.76 atm because of the altitude (7,300 ft or 2,250 m) of the laboratory. The parasitic power loss to run the blower, compressor and pump was about 2.5% at maximum power, not including the electronic controls. While rheostats were used here, chopper-type DC motor controllers are typically over 80% efficient, so the parasitic losses should still be on the order of only 3%.

In general, the 12-cell stack and system worked well, but difficulties were encountered sealing between the H$_2$ and H$_2$O regions on the anode plates. As a result, it was necessary to balance the relative pressures of the two flow networks, which led to problems with stack stability. Individual cells within the stack would occasionally fail due to lack of water. It was apparent that the anode plate design was problematic with the inter-cell competition because of the high pressure drops obtained with the single, long, serpentine water channel per plate. Hence, the anode flow-field was redesigned such that the flow through the individual water channels was in a parallel, single-pass configuration in order to lessen substantially the pressure drop required to pump water through the channels.

Figures 5A, 5B:
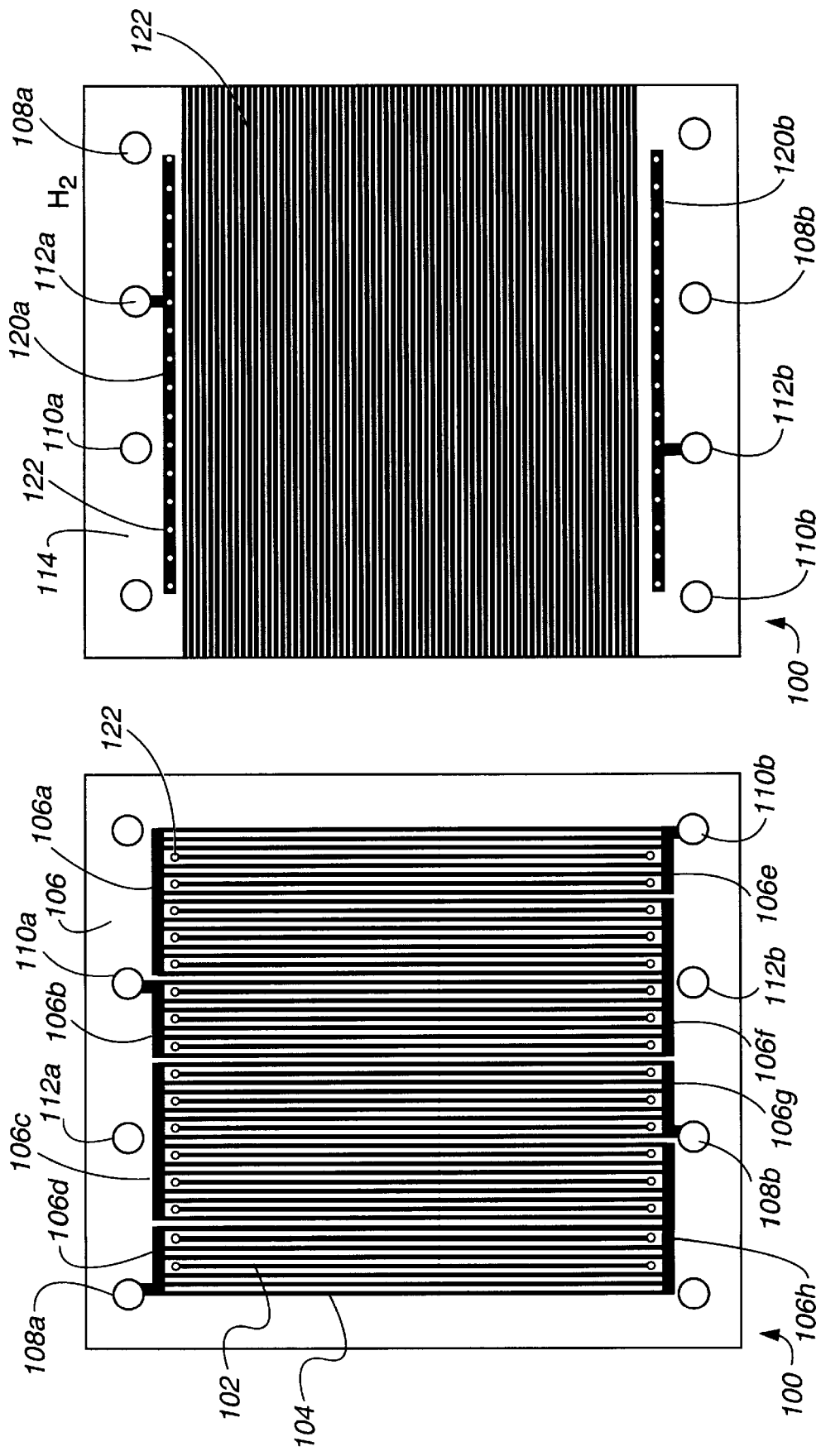
FIGS. 5A and 5B are plan views of the anode and cathode sides, respectively, of a bipolar plate according to one embodiment of the present invention.

FIGS. 5A and 5B are plan views of a bipolar plate design that allows the water flow to be in a single pass while the hydrogen channels maintain a serpentine configuration to facilitate the removal of condensate. FIG. 5A depicts the anode side 106 of bipolar plate 100 and FIG. 5B depicts the cathode side 114 of bipolar plate 100. Water channels 102 and hydrogen channels 104 are provided on anode side 106 of bipolar plate 100 with every third channel water-filled. Manifold penetrations 108a, 110a are each connected to six hydrogen channels 104 though headers 106a–h. The hydrogen then makes three 6-channel passes via distribution channels 106a–h through the flow field of anode 106 before exiting through the effluent manifold penetrations 108b, 110b. An anode backing and gaskets (not shown) prevent the hydrogen from channels 104 and headers 106a–h from directly accessing water channels 102.

Water is supplied to water channels 102 from manifold penetration 112a on cathode side 114 and through water distribution header 120a that supply penetrations 122 through bipolar plate 100 to water channels 102 on anode side 106. The water is removed from water channels 102 through header 120b by exit manifold 112b. Gaskets (not shown) on cathode side 114 prevent water in distribution headers 120a–b from leaking to the externally manifolded cathode air flow-channels 122.

In addition, the number of stitches used in the anode backing was increased to increase the amount of water that could be conveyed. The hydrogen channels were still arranged in a serpentine, or multiple-pass, configuration in order to keep the pressure drop higher than that which would be obtained with a single pass configuration to facilitate the removal of condensate. Water manifolding to channels 102 from distribution headers 120a–b greatly improved the water delivery to each cell. An 8-cell stack was assembled with the improved bipolar plate design.

Figure 6:
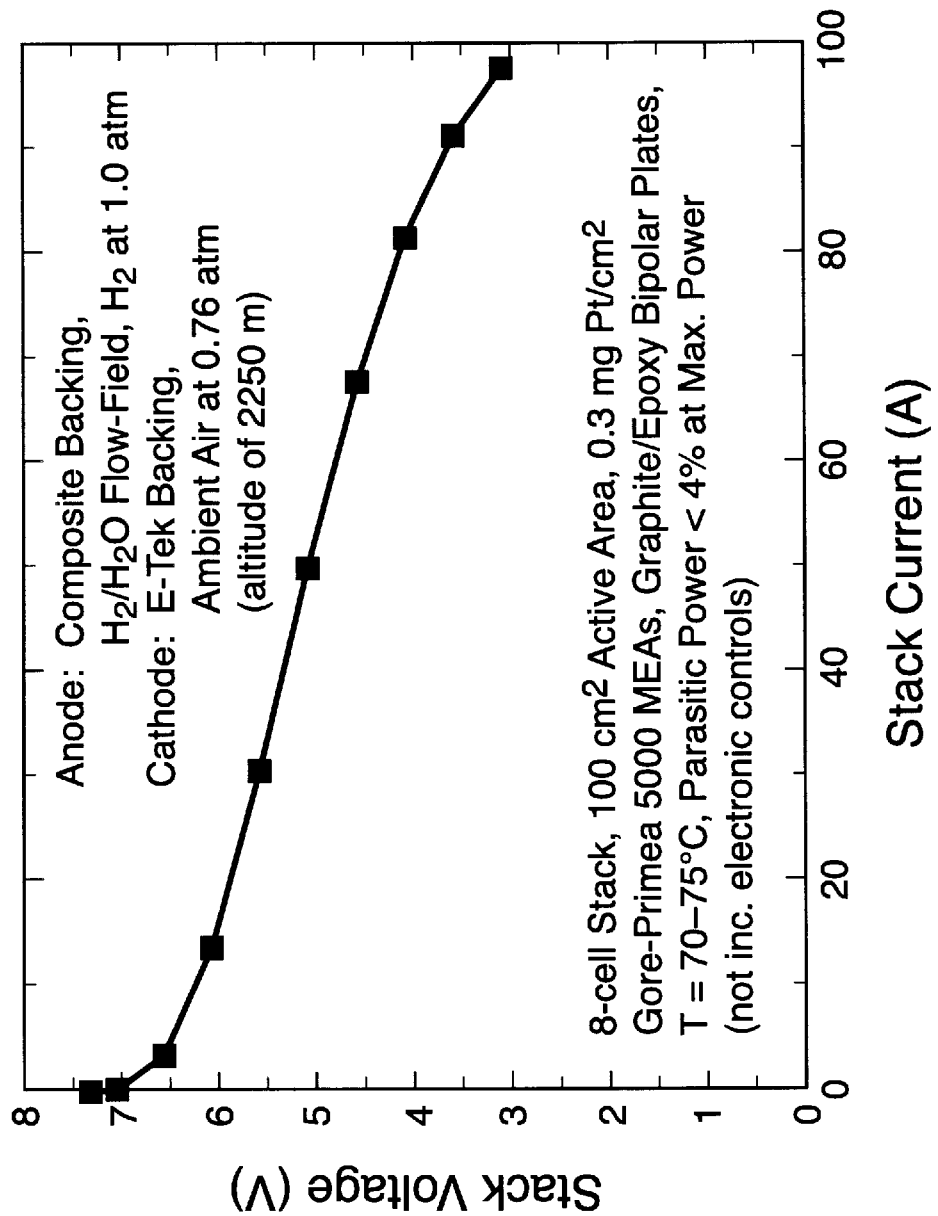
FIG. 6 is a polarization curve for an 8-cell stack using anode wicks with an air manifold pressure of about 2" $H_2O$.

With the enhanced hydration and more uniform water supply, an increase in manifold air pressure (and hence, flowrate) to 2 in. H$_2$O improved performance at the higher current density ranges. A polarization curve of the 8-cell stack is provided in FIG. 6. The cells on average provided nearly 800 mA/cm$^2$ at 0.5 V/cell, about a third better than the 12-cell stack, and the low current density performance was much improved over the 12-cell stack (although the latter results were for MEAs with several iterations on them). The parasitic losses were 3.5% at maximum power which was higher than the 12-cell because the blower was not as effective at the higher manifold pressure. The 8-cell stack provided much more consistent operation from cell-to-cell and closely reflected the performance obtained from a single cell.

Figure 7:
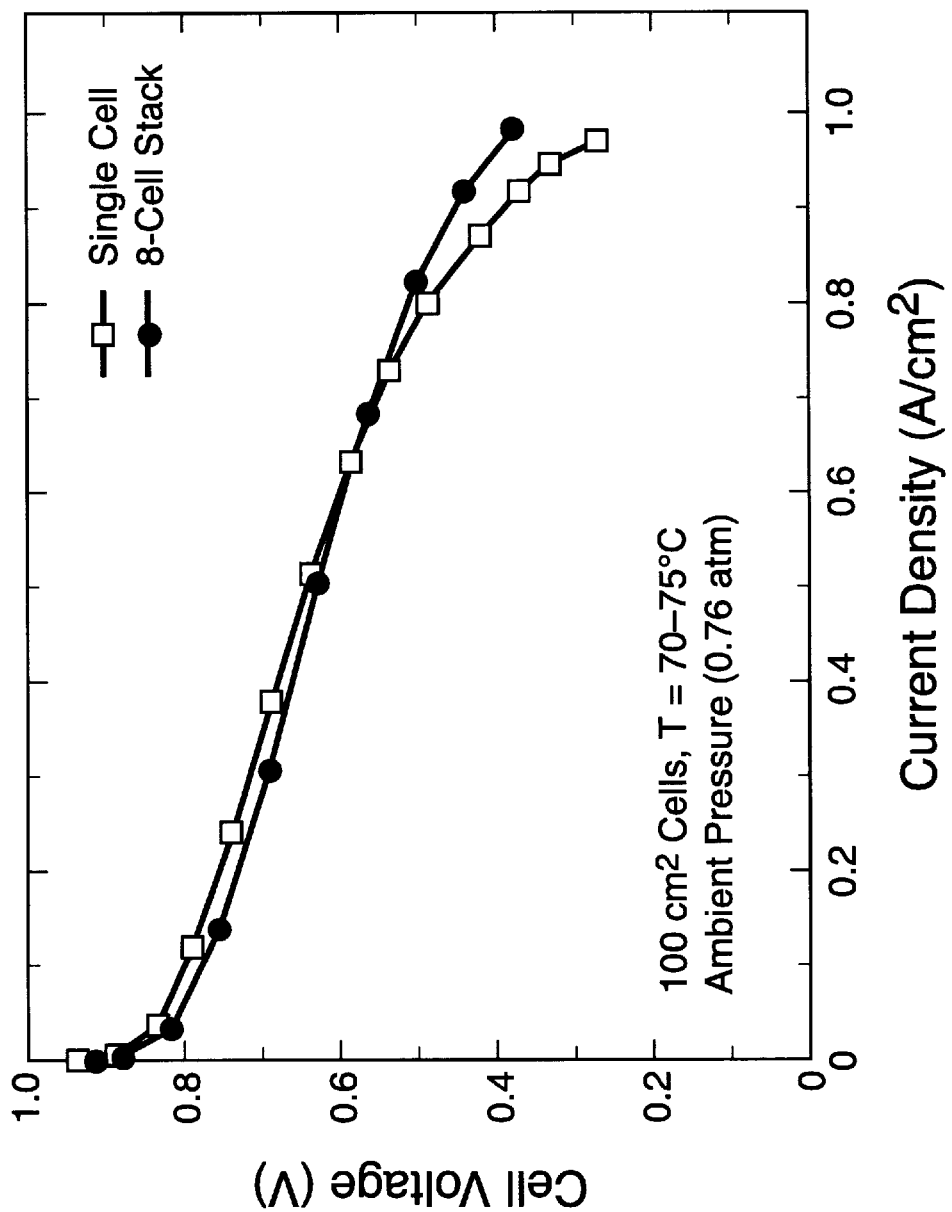
FIG. 7 depicts polarization curves comparing the performance of a single cell with the average of the 8-cell stack performance shown in FIG. 5.

FIG. 7 compares the "average" cell performance of the 8-cell stack to a single cell operating under roughly similar conditions as the stack. The closeness of the two curves illustrates that the "scale-up" from a single cell to a manifolded stack did not result in any difficulties with reactant or water supply to the individual cells.

A comparison of the power densities of the two stacks at "nominal" and maximum power is shown in Table I. Depending on the criteria used for the calculation, the stack in the 8-cell system provided a maximum volumetric power density of over 1 kW/L.

TABLE 1

Volumetric Power Densities of the Two Stacks.

| Stack | Plate Area @ 0.7 V/cell (W/cm$^3$)$_a$ | Active Area @ 0.7 V/cell (W/cm$^3$)$_b$ | Plate Area @ 0.5 V/cell (W/cm$^3$)$_a$ | Active Area @ 0.5 V/cell (W/cm$^3$)$_b$ |
|---|---|---|---|---|
| 12-Cell$_c$ | 0.22 | 0.36 | 0.52 | 0.85 |
| 8-Cell$_c$ | 0.26 | 0.43 | 0.62 | 1.02 |

$_a$- Considers full bipolar plate area (end-plates not included).
$_b$- Considers active area, not manifold or sealing areas (end-plates not included).
$_c$- Ambient pressure (0.76 atm) stacks w/ 100 cm$^2$ active area using graphite / epoxy plates.

The volumetric power densities of the 8-cell and 12-cell stacks reported in Table 1 compare favorably with pressurized fuel cell stacks. If the net power densities of the pressurized and the ambient pressure stacks are compared, then the ambient system has an advantage because of its substantially lower parasitic power requirements.

As an illustration, to equal the same efficiency and net areal power density of an ambient pressure system with, e.g., 5% parasitic power losses operating at 0.7 V/cell, a pressurized stack with a 20% parasitic power system would need to operate at 0.83 V/cell, where the current densities are quite similar to those attained in the ambient pressure stack at 0.7 V/cell. For such similar areal net power densities, the ambient pressure stack would actually have higher volumetric net power densities because the ambient stack would not need the cooling plates or humidification modules of the pressurized system.

Clearly, the performance edge of pressurized systems is negated by their high parasitic power requirements. The ambient system then has cost and size advantages since fewer auxiliary components, such as cooling plates, humidification modules, an air compressor, and the like, are required and the system is designed for the low pressure/ambient pressure with concomitant reduction is component size requirements.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An ambient pressure fuel cell system comprising:
   a fuel cell stack comprising a plurality of fuel cells having membrane/electrode assemblies, MEAs, that are hydrated with liquid water and bipolar plates with anode and cathode sides for respectively distributing hydrogen fuel gas and liquid water to a first side of each one of said MEAs and ambient air with reactant oxygen gas to a second side of each one of said MEAs, where said fuel gas and liquid water are provided separately to channels to said anode side of each said MEA;
   a liquid water supply to said fuel cells for hydrating said MEAs;
   a hydrogen fuel gas supply; and
   a near-ambient pressure blower for blowing air in excess of reaction stoichiometric amounts through said fuel cell stack to provide oxygen for electrochemical reaction at said cathode side and evaporative cooling at said cathode side of each fuel cell.

2. The ambient pressure fuel cell system according to claim 1, wherein each one of said bipolar plates has a flow field defined by parallel grooves on said cathode side of said bipolar plate to uniformly distribute said air over said cathode side of an adjacent membrane/electrode assembly and minimize pressure drop across said flow field.

3. The ambient pressure fuel cell system according to claim 1, wherein said hydrogen fuel gas supply includes a recirculation system having a pump for generating a circulating flow of said hydrogen gas through said separate channels for said fuel gas in said anode side of each one of said bipolar plates.

4. The ambient pressure fuel cell system according to claim 3, wherein said recirculating system further includes a water trap to separate water from said unused hydrogen gas.

5. The ambient pressure fuel cell system according to claim 4, further including a water pump to return water from said water trap to said fuel cell stack for hydrating said MEAs.

6. The ambient pressure fuel cell system according to claim 1, further including a condenser for removing water in air exhausted from said fuel cell stack after reaction with said hydrogen fuel gas.

7. The ambient pressure fuel cell system according to claim 1, wherein said blower further includes a controller responsive to fuel cell temperature for controlling said air flowing through said fuel cell stack to provide temperature control for said fuel cell stack by evaporative cooling from water adjacent said cathode sides of said bipolar plates.

8. The ambient pressure fuel cell system according to claim 1, wherein each one of said anode sides includes flow channels to provide parallel single pass flow paths for liquid water and serpentine paths for said hydrogen fuel gas.

9. The ambient pressure fuel cell system according to claim 2, wherein each one of said anode sides includes flow channels to provide parallel single pass flow paths for liquid water and serpentine paths for said hydrogen fuel gas.

* * * * *